United States Patent
Ahn et al.

(10) Patent No.: US 11,611,090 B2
(45) Date of Patent: Mar. 21, 2023

(54) FUEL CELL HUMIDIFIER WITH BYPASS TUBE

(71) Applicants: Hyundai Motor Company, Seoul (KR); Kia Motors Corporation, Seoul (KR); Kolon Industries, Inc., Seoul (KR)

(72) Inventors: Woong-Jeon Ahn, Gyeonggi-do (KR); Kyoung-Ju Kim, Gyeonggi-do (KR); Young-Seok Oh, Gyeonggi-do (KR); Jin-Hyung Lee, Gyeonggi-do (KR); Na-Hyeon An, Gyeonggi-do (KR); Chang-Ha Lee, Gyeonggi-do (KR); Hyun-Yoo Kim, Seoul (KR)

(73) Assignees: Hyundai Motor Company, Seoul (KR); Kia Motors Corporation, Seoul (KR); Kolon Industries, Inc., Seoul (KR)

( * ) Notice: Subject to any disclaimer, the term of this patent is extended or adjusted under 35 U.S.C. 154(b) by 184 days.

(21) Appl. No.: 16/499,126

(22) PCT Filed: Feb. 23, 2018

(86) PCT No.: PCT/KR2018/002258
§ 371 (c)(1),
(2) Date: Sep. 27, 2019

(87) PCT Pub. No.: WO2018/182178
PCT Pub. Date: Oct. 4, 2018

(65) Prior Publication Data
US 2021/0111420 A1     Apr. 15, 2021

(30) Foreign Application Priority Data
Mar. 27, 2017   (KR) .................. 10-2017-0038205

(51) Int. Cl.
*H01M 8/04119*  (2016.01)
*H01M 8/10*  (2016.01)

(52) U.S. Cl.
CPC ............ *H01M 8/04149* (2013.01); *H01M 8/04119* (2013.01); *H01M 8/04141* (2013.01); *H01M 2008/1095* (2013.01)

(58) Field of Classification Search
CPC ..... H01M 8/04149; H01M 2008/1095; H01M 8/04141; H01M 8/04119; H01M 8/04156;
(Continued)

(56) References Cited

U.S. PATENT DOCUMENTS 7,838,160 B2   11/2010  Suzuki et al.
2006/0147774 A1 * 7/2006  Suzuki ............. H01M 8/04164
                                                            429/414
(Continued)

FOREIGN PATENT DOCUMENTS

CN   102648547 A   8/2012
JP   2001201121 A   7/2001
(Continued)

OTHER PUBLICATIONS

Machine translation of JP 2008-226529, Kanazawa Hiroshi, 2008 (Year: 2008).*
(Continued)

*Primary Examiner* — Kwang Han
(74) *Attorney, Agent, or Firm* — Fox Rothschild LLP

(57) ABSTRACT

A fuel cell humidifier may completely or substantially completely prevent condensate water from entering a running fuel cell stack. The fuel cell humidifier includes a housing; a plurality of hollow fiber membranes arranged in the housing; a cap which is coupled to one end of the housing and has an air discharge port for supplying humidified air to the fuel cell stack; and a bypass tube for trans-
(Continued)

ferring condensate water generated from the humidified air to an interior space of the housing through which a discharge gas flows, wherein a first end of the bypass tube is disposed inside the air discharge port, and the bypass tube is in fluid communication with the interior space of the housing through a second end of the bypass tube.

10 Claims, 3 Drawing Sheets

(58) Field of Classification Search
CPC .......... B01D 2313/083; B01D 2313/20; B01D 2313/08; B01D 63/02; Y02E 60/50
See application file for complete search history.

(56) References Cited

U.S. PATENT DOCUMENTS

| | | | | |
|---|---|---|---|---|
| 2012/0282533 | A1* | 11/2012 | Kim | .................. H01M 8/04149 429/413 |
| 2014/0048228 | A1* | 2/2014 | Hansen | .................. F25J 1/0002 165/58 |
| 2017/0077531 | A1* | 3/2017 | Kim | .................. H01M 8/04141 |
| 2018/0062187 | A1 | 3/2018 | Kim et al. | |

FOREIGN PATENT DOCUMENTS

| | | | | |
|---|---|---|---|---|
| JP | 2003065566 | A | 3/2003 | |
| JP | 2005-098695 | A | 4/2005 | |
| JP | 2005156001 | A | 6/2005 | |
| JP | 2005158429 | A | 6/2005 | |
| JP | 2005-337539 | A | 12/2005 | |
| JP | 2006147484 | A | 6/2006 | |
| JP | 2008-226529 | * | 9/2008 | ............. H01M 8/04 |
| KR | 10-2012-0020461 | A | 3/2012 | |
| KR | 10-1592423 | B1 | 2/2016 | |
| KR | 10-2017-0031347 | A | 3/2017 | |
| KR | 101755516 | B1 | 7/2017 | |
| KR | 1020180048003 | A | 5/2018 | |

OTHER PUBLICATIONS

Search Report European Patent Appl'n No. 18778184.4, dated Jan. 12, 2021, 8 pages.

Office Action of Japanese Patent Office in Application No. 2019-552590, dated Jul. 27, 2021, 03 pages of Japanese Office Action only.

Chinese Office Action received for Chinese Application No. 201880022086.4, dated Jan. 4, 2022, 13 pages.

* cited by examiner

FUEL CELL HUMIDIFIER WITH BYPASS TUBE

CROSS-REFERENCE TO RELATED APPLICATION

This application is the U.S. national stage pursuant to 35 U.S.C. § 371, of International Application Ser. No. PCT/KR2018/02258, filed Feb. 23, 2018, which claims the benefit of priority of Korean Application No. 10-2017-0038205, filed Mar. 27, 2017, which are hereby expressly incorporated by reference in their entirety.

BACKGROUND

(a) Technical Field

The present disclosure relates to a fuel cell humidifier, more particularly, to the fuel cell humidifier that may completely or substantially completely prevent condensate water from flowing into a running fuel cell stack.

(b) Description of the Related Art

A fuel cell is a device for generating electricity while producing water by reacting hydrogen, which is a fuel, with oxygen in the air. High purity hydrogen is supplied from a hydrogen storage tank to an anode of a fuel cell stack, and air in the atmosphere is supplied to a cathode of the fuel cell stack through an air supply device such as a blower.

Hydrogen supplied to the anode of the fuel cell stack is separated into hydrogen ions and electrons. Hydrogen ions move to the cathode through a polymer electrolyte membrane between the anode and the cathode, and electrons move to the cathode through an external conductor. Oxygen supplied to the cathode of the fuel cell stack generates electrical energy while combining with electron and hydrogen ions to produce water.

When ion conductivity of the polymer electrolyte membrane of the fuel cell stack is higher, then the hydrogen ions are more easily transferred from the anode to the cathode. The ion conductivity of the polymer electrolyte membrane is closely related to water content. That is, as the polymer electrolyte membrane is sufficiently wetted, the hydrogen ions may be better transferred from the anode to the cathode.

Accordingly, it is necessary to maintain the water content at a certain level by continuously supplying moisture to the polymer electrolyte membrane when the fuel cell operates, thereby preventing power generation efficiency of the fuel cell from being rapidly reduced. For this purpose, a humidifier, which may provide moisture to the air supplied to the cathode of the fuel cell stack, is utilized.

The fuel cell humidifier humidifies the air supplied from the outside with moisture in an off-gas discharged from the cathode of the stack, and supplies the humidified air to the cathode of the stack.

Condensate water is inevitably caused in the humidifier as the humidified air contacts the physical structure of the humidifier (e.g., a hollow fiber membrane for humidification, a passage structure through which the humidified air flows, etc.). When the condensate water flows into the running fuel cell stack, it causes a reduction in the power generation efficiency. Accordingly, it is desirable to take measures to prevent the condensate water from flowing into the running fuel cell stack.

U.S. Pat. No. 7,264,233 (hereinafter referred to as the '233 patent) discloses a humidifier 1 capable of transferring the condensate water that is stagnant in a liquid pool area 33 inside a downstream head 3 through which humidified air flows to a lead-in manifold 5 through which off-gas flows. For this purpose, the humidifier 1 of the '233 patent includes a communicating tube 6 for connecting the liquid pool area 33 where the condensate water is stagnant with the lead-in manifold 5. That is, it is assumed that the condensate water falls down by gravity to be necessarily collected in a lower region (referred to as the "liquid pool area") 33 inside the downstream head 3.

However, in the '233 patent, it is apparent that (i) condensate water generates even within the hollow fiber membranes 42 where humidification is performed, and (ii) when the external air is suddenly supplied at high pressure by switching from a low current mode to a high current mode, the condensate water that has been stagnant in the hollow fiber membranes 42 is discharged from the hollow fiber membranes 42 together with the high pressure air and then discharged from the humidifier 1 immediately without passing through the liquid pool area inside the downstream head 3 to flow into the fuel cell stack. That is, in the '233 patent, a considerable amount of condensate water still may be forced to flow into the running fuel cell stack, thereby not preventing the reduction in the power generation efficiency.

Further, since a transfer passage 6 of the '233 patent formed on the downstream head 3 is exposed to the outside, there is a high risk that the condensate water will be frozen in the communicating tube 6 in a harsh cold environment. This freezing of the condensate water in the communicating tube 6 may disturb the condensate water that has been stagnant in the liquid pool area 33 inside the downstream head 3 from being discharged from the liquid pool area 33 through the communicating tube 6, and as a result, the condensate water flows into the fuel cell stack, thereby causing a reduction in the power generation efficiency.

SUMMARY

Accordingly, the present disclosure relates to a fuel cell humidifier capable of preventing problems caused by the above limitations and disadvantages of the related art.

One aspect of the present disclosure is to provide a fuel cell humidifier capable of completely or substantially completely preventing condensate water from flowing into a running fuel cell stack.

In addition to the foregoing aspect of the present disclosure, other features and advantages of the present disclosure will be described below, or will be clearly understood by those skilled in the art to which the present disclosure pertains from such description.

According to one aspect of the present disclosure as described above, provided is a fuel cell humidifier for humidifying air supplied from outside with moisture in an off-gas discharged from a fuel cell stack and supplying the humidified air to the fuel cell stack, including a humidification module including a housing and a plurality of hollow fiber membranes arranged in the housing; a first cap having an air discharge port for supplying the humidified air to the fuel cell stack and coupled to a first termination end of the humidification module, the air discharge port being spaced apart from the humidification module; and a bypass tube for transferring the condensate water generated from the humidified air to the interior space of the housing through which the off-gas flows, and a first end of the bypass tube is positioned in the air discharge port, and the bypass tube is in fluid communication with the interior space of the housing through a second end of the bypass tube.

The fuel cell humidifier may further include a second cap having an air inlet port for receiving the air supplied from the outside and coupled to a second termination end of the humidification module at the opposite side of the first termination end.

The interior space of the first cap defined by the inner surface of the first cap and the first termination end of the humidification module and the interior space of the second cap defined by the inner surface of the second cap and the second termination end of the humidification module may be in fluid communication with each other only through lumens of the hollow fiber membranes.

The housing may have an off-gas inlet port for receiving the off-gas from the fuel cell stack and an off-gas outlet port for discharging the off-gas.

The housing may include a first housing including the hollow fiber membranes and a second housing surrounding the first housing and including the off-gas inlet port and the off-gas outlet port, and the first housing may have a first group of openings corresponding to the off-gas inlet port and a second group of openings corresponding to the off-gas outlet port.

The hollow fiber membranes may include two or more hollow fiber membrane bundles, the housing may include two or more first housings including the two or more hollow fiber membrane bundles, respectively; and a second housing surrounding the first housings and having the off-gas inlet port and the off-gas outlet port, and each of the first housings may have a first group of openings corresponding to the off-gas inlet port and a second group of openings corresponding to the off-gas outlet port.

The condensate water may be generated in the interior space of the first cap or may flow into the interior space of the first cap from the hollow fiber membranes and then may be transferred to the interior space of the housing through the bypass tube.

The longitudinal direction of the air discharge port and the longitudinal direction of the hollow fiber membranes may not be parallel to each other.

The first cap may have a rib configured to prevent the condensate water from being transferred to the fuel cell stack through the air discharge port, the rib being disposed in the air discharge port, and a first end of the bypass tube may be positioned adjacent to the rib.

A screw thread for providing a spiral path to the condensate water may be formed on the inner surface of the air discharge port.

The first end of the bypass tube may be positioned adjacent to the termination portion of the screw thread, in order to transfer the condensate water, which flows into the air discharge port to reach the termination portion of the screw thread through the spiral path, to the interior space of the housing.

The bypass tube may include a first tube fixed to the first cap; and a second tube fixed to the humidification module, and the first and second tubes may be detachably coupled.

The bypass tube may not be exposed to the outside.

It should be understood that both the foregoing general description and the following detailed description are merely intended to illustrate or explain the present disclosure, and to provide a more detailed description of the disclosure of the claims.

According to the present disclosure, all condensate water generated due to condensation of humidified air, that is, not only the condensate water generated in the interior space of the first cap, but also the condensate water generated in the lumen of the hollow fiber membranes to flow into the interior space of the first cap may be transferred to the interior space (i.e., a space where the off-gas flows) of the housing, thereby completely or substantially completely preventing the condensate water from flowing into the running fuel cell stack. Accordingly, a reduction in power generation efficiency due to the condensate water flowing into the fuel cell stack may be prevented.

Further, according to an embodiment of the present disclosure, since the bypass tube of the present disclosure is not exposed to the outside, the condensate water in the bypass tube may be prevented from being frozen even in a cold environment. Accordingly, the condensate water may be prevented from flowing into the fuel cell stack without bypassing due to the freezing of the condensate water in the bypass tube.

BRIEF DESCRIPTION OF THE DRAWINGS

The accompanying drawings are to help understanding of the present disclosure and constitute a part of the present specification, and exemplify an embodiment of the present disclosure, and explain the principles of the present disclosure together with the detailed description of the disclosure.

DETAILED DESCRIPTION OF THE EMBODIMENTS

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Hereinafter, embodiments of the present disclosure will be described in detail with reference to the accompanying drawings.

Figure 1:
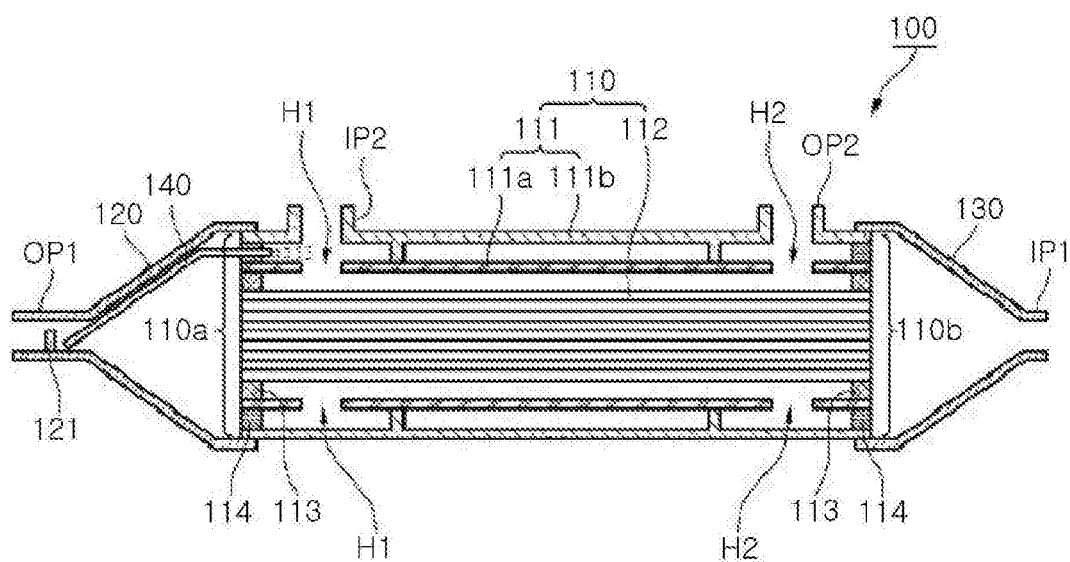
FIG. 1 is a cross-sectional diagram of a fuel cell humidifier according to a first embodiment of the present disclosure.

FIG. 1 is a cross-sectional diagram of a fuel cell humidifier according to a first embodiment of the present disclosure.

A fuel cell humidifier 100 of the present disclosure is a device for humidifying air supplied from an outside with moisture in off-gas discharged from a fuel cell stack (not shown), and supplying the humidified air to the fuel cell stack.

As shown in FIG. 1, the humidifier 100 of the present disclosure includes a humidification module 110 having first and second termination ends 110a, 110b, a first cap 120 having an air discharge port (OP1) for supplying the humidified air to the fuel cell stack and coupled to the first termination end 110a, and a second cap 130 having an air inlet port (IP1) for receiving the air supplied from the outside and coupled to the second termination end 110b.

The air discharge port (OP1) of the first cap 120 and the air inlet port (IP1) of the second cap 130 are spaced apart from the humidification module 110, respectively.

The humidification module 110 includes a housing 111 and a plurality of hollow fiber membranes 112 disposed in the housing 111. The housing 111 has an off-gas inlet port (IP2) for receiving off-gas from a fuel cell stack and an off-gas outlet port (OP2) for discharging the off-gas.

As shown in FIG. 1, the housing 111 according to an embodiment of the present disclosure includes a first housing 111a including the hollow fiber membranes 112 and a second housing 111b surrounding the first housing 111a and having the off-gas inlet port (IP2) and the off-gas outlet port (OP2), and the first housing 111a has a first group of openings (H1) corresponding to the off-gas inlet port (IP2) and a second group of openings (H2) corresponding to the off-gas outlet port (OP2).

Both termination ends of the hollow fiber membrane 112 are potted to first fixing layers 113 formed, respectively, in both termination ends of the first housing 111a, respectively, and both termination ends of the first housing 111a are fixed to both termination ends of the second housing 111b through second fixing layers 114, respectively.

Alternatively, the housing 111 of the present disclosure may be a single housing including the hollow fiber membranes 112. In this case, both termination ends of the hollow fiber membrane 112 may be potted to the fixed layers formed, respectively, in both termination ends of the single housing, respectively.

According to another embodiment of the present disclosure, the hollow fiber membranes 112 may include two or more hollow fiber membrane bundles, and the housing 111 may include two or more first housings 111a including the two or more hollow fiber membrane bundles, respectively, and the second housing 111b surrounding the first housings 111a and having the off-gas inlet port (IP2) and the off-gas outlet port (OP2), and each of the first housings 111a may have the first group of openings (H1) corresponding to the off-gas inlet port (IP2) and the second group of openings (H2) corresponding to the off-gas outlet port (OP2).

According to the present disclosure, the interior space of the first cap 120 and the interior space of the second cap 130 are in fluid communication with each other only through the lumens of the hollow fiber membranes 112. The interior space of the first cap 120 is defined by the inner surface of the first cap 120 and the first termination end 110a of the humidification module 110, and the interior space of the second cap 130 is defined by the inner surface of the second cap 130 and the second termination end 110b of the humidification module 110.

The off-gas flowing into the housing 111 through the off-gas inlet port (IP2) contacts the hollow fiber membranes 112 while flowing in the interior space of the housing 111 and then is discharged to the outside of the housing 111 through the off-gas outlet port (OP2).

The air flowing into the interior space of the second cap 130 from the outside through the air inlet port (IP1) flows into the interior space of the first cap 120 through the lumens of the hollow fiber membranes 112 and then is supplied to the fuel cell stack through the air discharge port (OP1).

When air flows along the lumen of the hollow fiber membrane 112, the moisture contained in the off-gas flowing through the interior space of the housing 111 passes through the hollow fiber membrane 112 to be transferred to the air, such that the air is humidified, and the humidified air flows into the interior space of the first cap 120 and then is supplied to the fuel cell stack through the air discharge port (OP1).

As described above, the condensate water generated by condensation of the humidified air in the lumen of the hollow fiber membrane 112 or in the interior space of the first cap 120 should be prevented from flowing into the fuel cell stack. For this purpose, as shown in FIG. 1, the fuel cell humidifier 100 of the present disclosure further includes a bypass tube 140.

The bypass tube 140 of the present disclosure may transfer the condensate water generated in the interior space of the first cap 120 or flowing into the interior space of the first cap 120 from the hollow fiber membranes 112 to the interior space of the housing 111 through which the off-gas flows.

According to the present disclosure, a first end of the bypass tube 140 is positioned in the air discharge port (OP1), and the bypass tube 140 is in fluid communication with the interior space of the housing 111 (i.e., the space through which the off-gas flows) through a second end of the bypass tube 140. For example, the second end of the bypass tube 140 may be positioned in the interior space of the housing 111 (i.e., the space through which the off-gas flows). The condensate water flowing into the air discharge port (OP1) may flow into the interior space of the housing 111 along the bypass tube 140 by the air pressure difference, thereby preventing the condensate water from being transferred to the fuel cell stack.

In order to move the condensate water, which is generated in the interior space of the first cap 120 or flows into the interior space of the first cap 120 from the hollow fiber membranes 112, to the fuel cell stack, it should necessarily pass through the air discharge port (OP1) of the first cap 120, such that the first end of the bypass tube 140 may be positioned in the air discharge port (OP1), thereby considerably preventing the condensate water generated by the condensation of the humidified air from flowing into the fuel cell stack.

Although the position of the bypass tube 140 is not specially limited in the present disclosure, as shown in FIG. 1, it may be disposed in the interior space of the first cap 120 and the interior space of the housing 111 so that the bypass tube 140 is not exposed to the outside. When the bypass tube 140 is not exposed to the outside, the condensate water may be prevented from being frozen in the bypass tube 140 even in a cold environment. Accordingly, the condensate water may be prevented from flowing into the fuel cell stack without bypassing due to the freezing of the condensate water in the bypass tube 140.

As shown in FIG. 1, a rib 121 may be provided in the air discharge port (OP1) in order to prevent the condensate water from being transferred to the fuel cell stack through the air discharge port (OP1). The rib 121 prevents the condensate water flowing into the air discharge port (OP1)

from flowing further toward the fuel cell stack. The condensate water whose flow has been blocked by the rib 121 is collected under the rib 121. Accordingly, as shown in FIG. 1, the first end of the bypass tube 140 may be positioned adjacent to the rib 121. That is, the first end of the bypass tube 140 may be positioned between the main body of the first cap 120, the boundary of the air discharge port (OP1), and the rib 121.

As described above, by switching from the low current mode to the high current mode, the condensate water that has been stagnant in the hollow fiber membranes 112 is discharged from the hollow fiber membranes 112 together with the high pressure air when the external air is suddenly supplied at high pressure to flow into the air discharge port (OP1). However, since the rib 121 does not block the entire passage of the air discharge port (OP1), it may not be said that there is no risk in which some of the condensate water discharged from the hollow fiber membranes 112 to flow into the air discharge port (OP1) may not be blocked by the rib 121 and transferred to the fuel cell stack.

Figure 2:
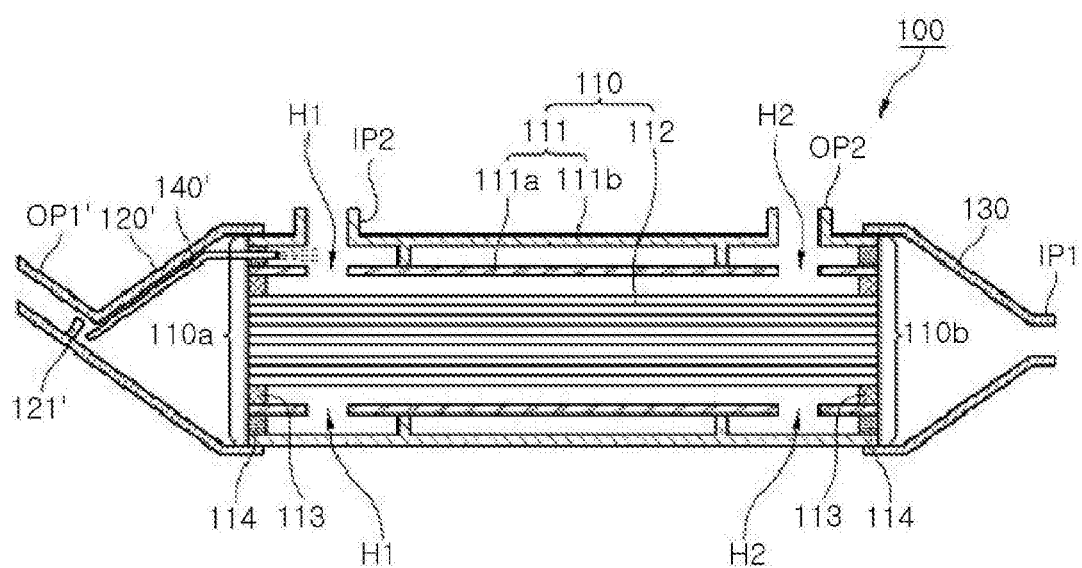
FIG. 2 is a cross-sectional diagram of a fuel cell humidifier according to a second embodiment of the present disclosure.

In order to minimize this risk, as shown in FIG. 2, an air discharge port (OP1') of a first cap 120' according to another embodiment of the present disclosure may have a longitudinal direction that is not parallel to the longitudinal direction of the hollow fiber membranes 112. For example, it is possible to form the air discharge port (OP1') so that the humidified air may flow upwards at a predetermined angle, thereby blocking most of the condensate water discharged in the longitudinal direction of the hollow fiber membrane 112 by a rib 121'.

However, in order to block the flow of the condensate water, not only the ribs 121, 121' need to have a certain size or more, but also have a surface perpendicular to the flow of the humidified air, such that there is a risk of reducing the power generation efficiency of the fuel cell because excessive resistance is applied to the flow of the humidified air.

Figure 3:
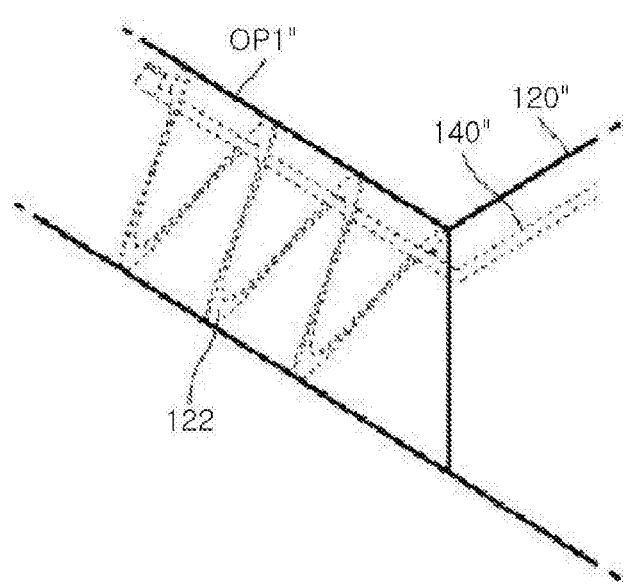
FIG. 3 is a diagram schematically showing a first cap and a bypass tube of a fuel cell humidifier according to a third embodiment of the present disclosure.

In order to counteract this risk, as shown in FIG. 3, a first cap 120" according to still another embodiment of the present disclosure may include a screw thread 122 formed on the inner surface of an air discharge port (OP1"). The screw thread 122 provides a spiral path to the condensate water flowing into the air discharge port (OP1").

The screw thread 122 may replace the rib 121 of FIG. 1. That is, the screw thread 122 of the present disclosure may also be formed on the inner surface of the air discharge port (OP1) extending in the direction parallel to the longitudinal direction of the hollow fiber membrane 112. However, as shown in FIG. 3, when the air discharge port (OP1") is inclined so that the humidified air may flow upwards at a predetermined angle, there is further advantageous in that substantially all condensate water flowing into the air discharge port (OP1") may be guided by the screw thread 122.

In order to transfer the condensate water that flows into the air discharge port (OP1") to reach the termination portion of the screw thread 122 through the spiral path to the interior space of the housing 111, a first end of a bypass tube 140" may be positioned adjacent to the termination portion of the screw thread 122. That is, the first end of the bypass tube 140" is disposed to receive all of the condensate water moved to the termination portion of the screw thread 122 through the spiral path.

According to an embodiment of the present disclosure shown in FIG. 3, it is possible not only to prevent the power generation efficiency of the fuel cell from being reduced because excessive resistance is applied to the flow of the humidified air, but also to transfer all condensate water generated due to the condensation of the humidified air, that is, the condensate water generated in the interior space of the first cap 120" but also the condensate water generated in the lumen of the hollow fiber membranes 112 to flow into the interior space of the first cap 120" to the interior space of the housing 111 (i.e., the space through which the off-gas flows), thereby completely or substantially completely preventing the condensate water from flowing into the running fuel cell stack.

The bypass tubes 140, 140', 140" of the present disclosure shown in FIGS. 1 to 3, respectively may be a single monolithic tube.

Figure 4:
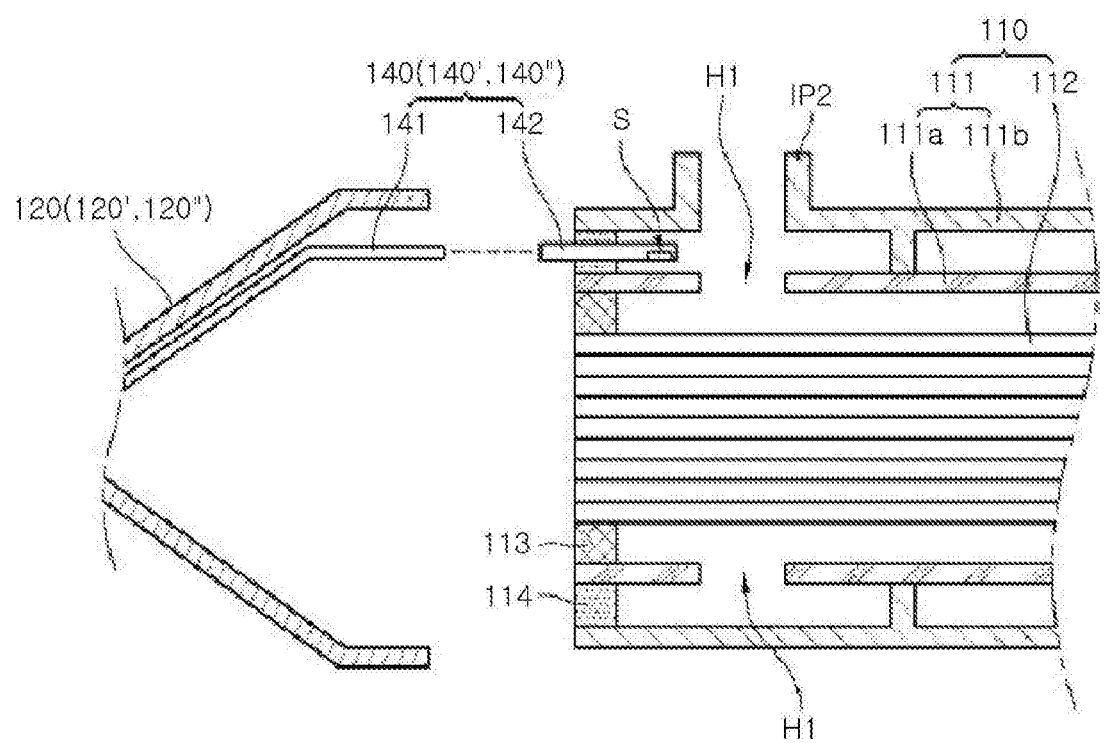
FIG. 4 is a diagram schematically showing a bypass tube according to an embodiment of the present disclosure.

Alternatively, as shown in FIG. 4, the bypass tubes 140, 140', 140" of the present disclosure may include a first tube 141 fixed to the first caps 120, 120', 120" and a second tube 142 fixed to the humidification module 110, and the first and second tubes 141, 142 may be detachably coupled. That is, when the first caps 120, 120' and 120" are coupled to the humidification module 110, the first tube 141 may also be coupled to the second tube 142, thereby enhancing convenience and productivity of the manufacturing process of the humidifier 100.

The invention claimed is:

1. A fuel cell humidifier for humidifying air supplied from outside with moisture in an off-gas discharged from a fuel cell stack and supplying the humidified air to the fuel cell stack, the fuel cell humidifier comprising:
    a humidification module comprising a housing and a plurality of hollow fiber membranes arranged in the housing;
    a first cap having an air discharge port for supplying the humidified air to the fuel cell stack and coupled to a first termination end of the humidification module, the air discharge port being spaced apart from the humidification module; and
    a bypass tube for transferring the condensate water generated from the humidified air to an interior space of the housing through which the off-gas flows,
    wherein a first end of the bypass tube is positioned in the air discharge port,
    wherein the bypass tube is in fluid communication with the interior space of the housing through a second end of the bypass tube,
    wherein a screw thread for providing a spiral path to the condensate water is formed on the inner surface of the air discharge port, and the air discharge port is inclined so that the humidified air flows upwards,
    wherein the first end of the bypass tube is positioned adjacent to the termination portion of the screw thread, to transfer the condensate water, which flows into the air discharge port to reach the termination portion of the screw thread through the spiral path, to the interior space of the housing.

2. The fuel cell humidifier of claim 1, further comprising a second cap having an air inlet port for receiving the air supplied from the outside and coupled to a second termination end of the humidification module at an opposite side of the first termination end.

3. The fuel cell humidifier of claim 2,
    wherein an interior space of the first cap, which is defined by an inner surface of the first cap and the first termination end of the humidification module, and an interior space of the second cap, which is defined by an inner surface of the second cap and the second termination end of the humidification module, are in fluid communication with each other only through lumens of the hollow fiber membranes.

4. The fuel cell humidifier of claim 1,
wherein the housing has an off-gas inlet port for receiving the off-gas from the fuel cell stack and an off-gas outlet port for discharging the off-gas.

5. The fuel cell humidifier of claim 4, wherein the housing comprises:
   a first housing comprising the hollow fiber membranes; and
   a second housing surrounding the first housing and comprising the off-gas inlet port and the off-gas outlet port, and
   wherein the first housing has a first group of openings corresponding to the off-gas inlet port and a second group of openings corresponding to the off-gas outlet port.

6. The fuel cell humidifier of claim 4,
wherein the hollow fiber membranes comprise two or more hollow fiber membrane bundles,
wherein the housing comprises:
   two or more first housings comprising the two or more hollow fiber membrane bundles, respectively; and
   a second housing surrounding the first housings and having the off-gas inlet port and the off-gas outlet port, and
   wherein each of the first housings has a first group of openings corresponding to the off-gas inlet port and a second group of openings corresponding to the off-gas outlet port.

7. The fuel cell humidifier of claim 1,
wherein the condensate water is generated in an interior space of the first cap or flows into the interior space of the first cap from the hollow fiber membranes and then is transferred to the interior space of the housing through the bypass tube.

8. The fuel cell humidifier of claim 1,
wherein a longitudinal direction of the air discharge port and a longitudinal direction of the hollow fiber membranes are not parallel to each other.

9. The fuel cell humidifier of claim 1, wherein the bypass tube comprises:
   a first tube fixed to the first cap; and
   a second tube fixed to the humidification module, and
   wherein the first and second tubes are detachably coupled.

10. The fuel cell humidifier of claim 1,
wherein the bypass tube is not exposed to the outside.

* * * * *